Oct. 2, 1951 J. C. FOSTER, SR., ET AL 2,569,712
PISTON TYPE FLUID BRAKE
Filed July 14, 1949 2 Sheets-Sheet 2
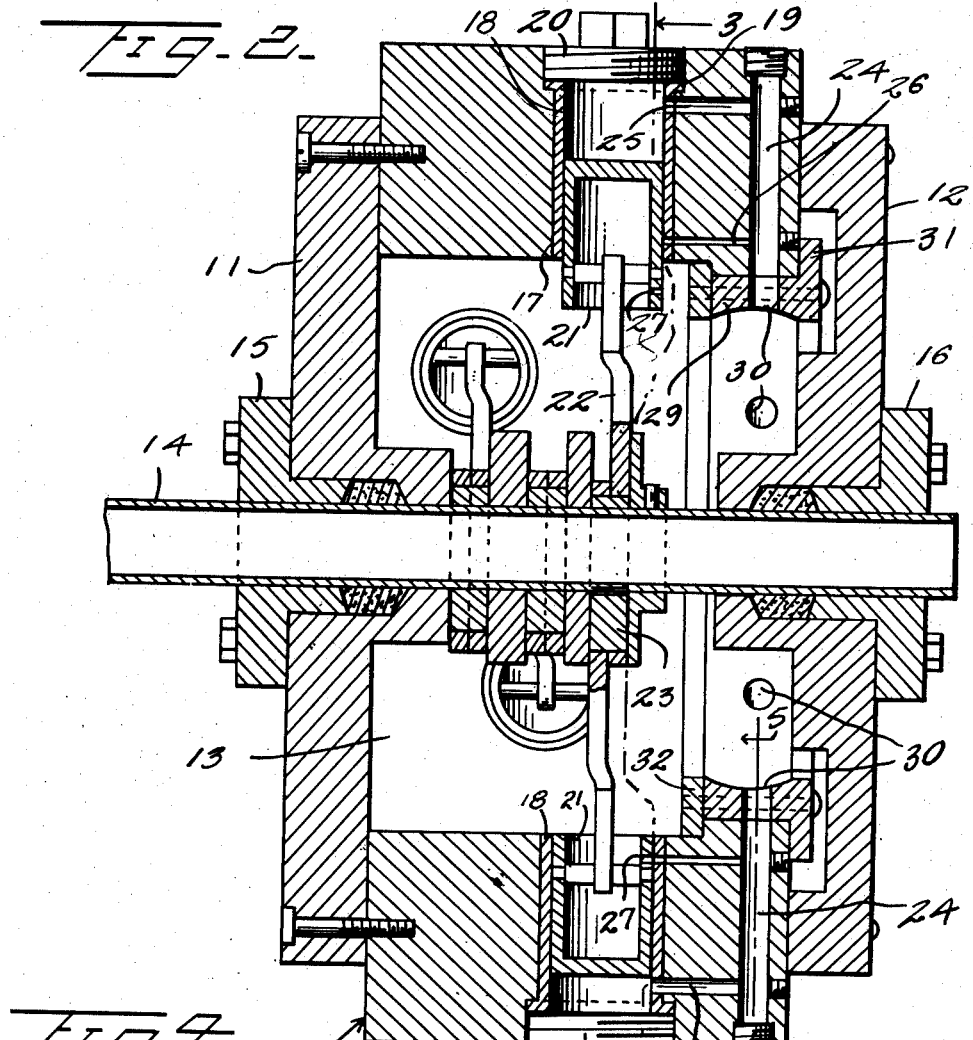
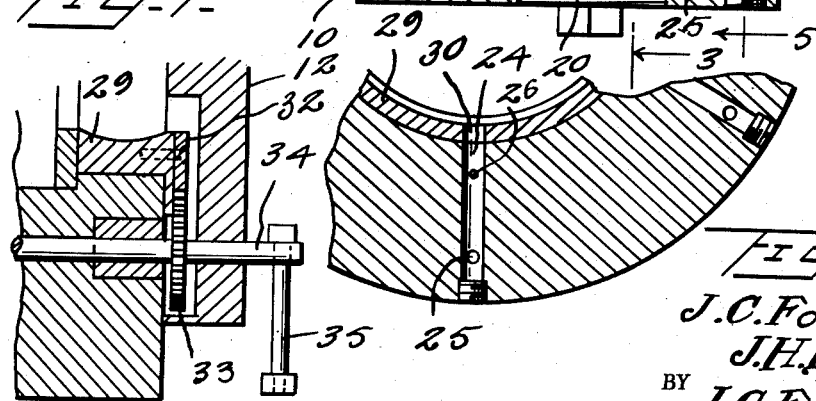
Inventors
J. C. Foster, Sr.,
J. H. Biggs,
J. C. Foster, Jr.
BY
Kimmel & Crowell
ATTORNEYS Patented Oct. 2, 1951

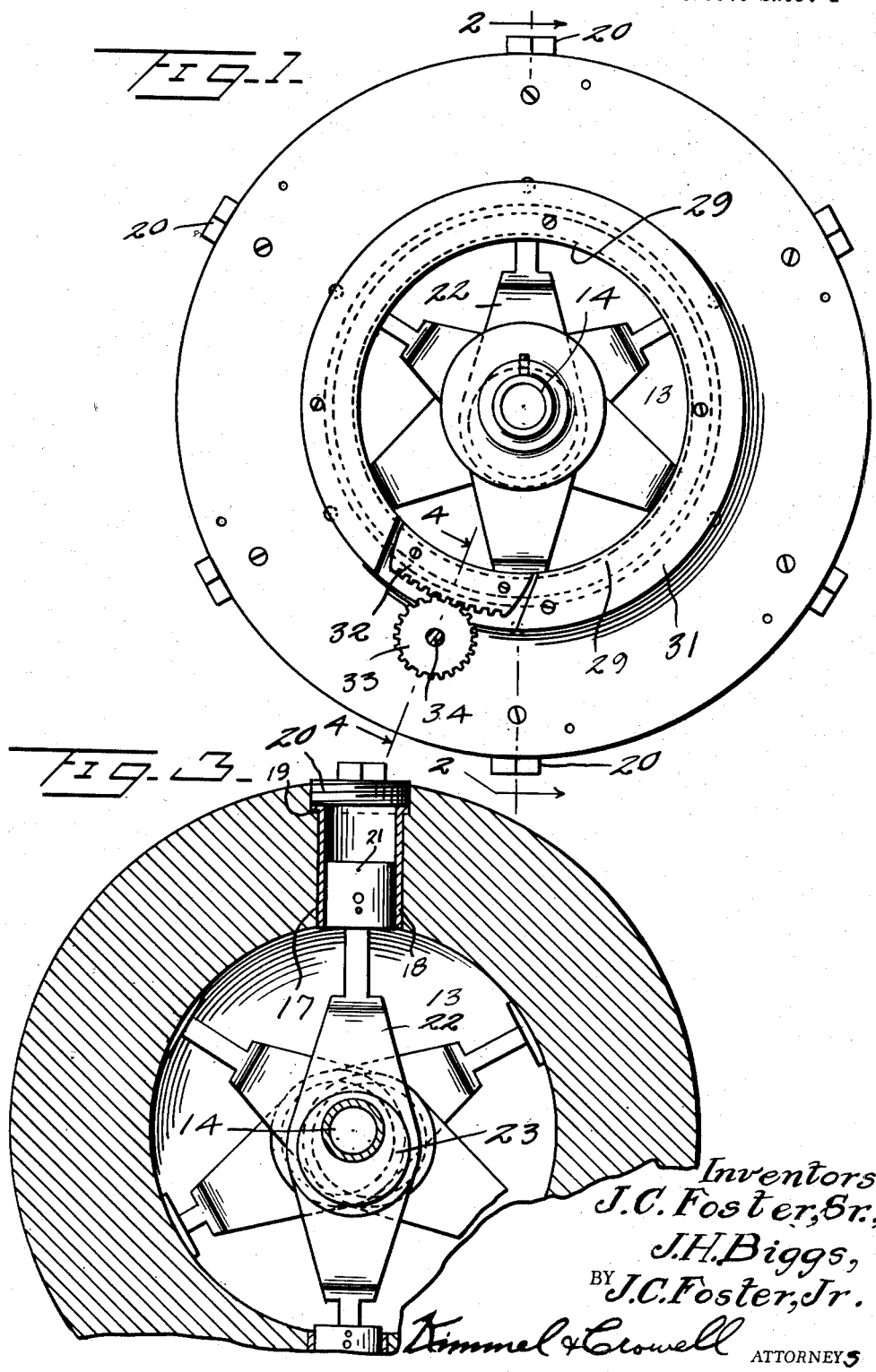

2,569,712

UNITED STATES PATENT OFFICE 2,569,712

PISTON TYPE FLUID BRAKE

John C. Foster, Sr., John Henry Biggs, and John C. Foster, Jr., Odessa, Tex.

Application July 14, 1949, Serial No. 104,762

4 Claims. (Cl. 188—91)

This invention relates to fluid or hydraulic brakes, and is an improvement over the construction embodied in Patent No. 2,277,096, issued March 24, 1942.

An object of this invention is to provide an improved brake of the fluid type whereby the rotation of a shaft may be braked, the braking force being regulated by means of a single regulating valve.

Another object of this invention is to provide a fluid brake wherein the maximum braking force is less than a positive locking of the device so that the driving shaft will not be completely locked.

A further object of this invention is to provide a fluid brake embodying a minimum of parts so that the device can be made strong enough to withstand the strains applied thereto, and can be made in a relatively small size.

With the above and other objects in view, our invention consists in the arrangement, combination and details of construction disclosed in the drawings and specification, and then more particularly pointed out in the appended claims.

In the drawings,

Figure 1 is a detail end elevation of a hydraulic brake constructed according to an embodiment of our invention, showing one end plate removed therefrom, Figure 2 is a sectional view taken on the line 2—2 of Figure 1, Figure 3 is a sectional view taken on the line 3—3 of Figure 2, Figure 4 is a fragmentary sectional view taken on the line 4—4 of Figure 1, Figure 5 is a fragmentary sectional view taken on the line 5—5 of Figure 2.

Referring to the drawings, the numeral 10 designates generally a stationary housing which has secured thereto end plates 11 and 12. The housing 10 is provided with a centrally disposed chamber 13 and a shaft 14 is journalled centrally through the end members 11 and 12. Packing glands 15 and 16 seal the shaft 14 with respect to the end members 11 and 12.

The housing 10 is formed with a plurality of radially disposed cylinders 17, and cylinder liners 18 are removably disposed in each cylinder 17, being provided at their outer ends with annular flanges 19.

A screw plug 20 is threaded into the outer end of each cylinder 17 for sealing the open outer end of each cylinder and for holding the lining 18 in the cylinder 17. There is a piston 21 slidable in each lining 18 which has a connecting rod 22 pivotally connected with the inner end thereof, and the connecting rod 22 engages a circular cam 23 which is fixed on the shaft 14. The cylinders 17 are arranged in diametrically opposed pairs and preferably, as shown in Figure 2, the pairs of cylinders are offset one pair to the adjacent pair.

The housing 10 is provided with a plurality of radially disposed ducts or ports 24 which communicate at their inner ends with the central chamber 13, and the housing or body 10 is also provided with connecting passages 25 which connect the radial passages or ports 24 with the outer portions of the cylinders 17. A bypass or bleeder passage 26 is formed in the body 10 between radial port 24 and cylinder 17 and as shown in Figure 2, the skirt of piston 21 is formed with a bleeder port 27. The port 27 is disposed in registry with bleeder passage 26 when piston 21 is at the inner end of its movement and is uncovered when the piston 21 moves outwardly after a slight outward movement of piston 21.

The operation of passages 26 and 27 is that of a by-pass or a bleeder operation to relieve pressure developed in passage 24 as the skirt aperture 27 registers with passage 26 to allow the piston to complete its movement toward the top of the cylinder. The skirt of the piston covers passage 26 during part of the up-stroke but is so designed that the interconnecting passages and the dimensions and position of passage 26 effect braking of maximum efficiency.

An annular valve member 29 is rotatably disposed in the chamber 13, being formed with a plurality of ports 30 adapted to be disposed in registry with ports 24, and valve member 29 is formed at its outer end with an annular flange 31. A retainer ring 32 is secured to the inner end of valve member 29 for holding the valve member 29 against endwise movement while permitting free circumferential movement or adjustment thereof. The valve member 29 has secured to the flange 31 thereof, as shown in Figure 1, a fragmentary gear member 32 which meshes with a circular adjusting gear 33. The gear 33 is mounted on a shaft 34 which is journalled through the end or head 12 and is provided on its outer end with a handle or lever 35 by means of which the shaft 34 and the gear 33 may be rotatably adjusted to provide for regulation of the opening or closing of ports 24.

In the use and operation of this device, the housing 10 is fixed to a suitable stationary element, and the shaft 14 is connected with a suitable rotating means which may be a vehicle axle, a driving shaft or other suitable means. When the brake is in a neutral position, valve member 29 is adjusted to provide for complete registry of ports 30 with ports 24. This will permit the free reciprocation of pistons 21 and the liquid which fills the chamber 13, together with the cylinders 17 and the passages 24 and 25, can freely flow back and forth. When it is desired to produce a braking force on shaft 14, valve member 29 is circumferentially adjusted to provide for the desired reduction to the liquid flow. The degree of positioning of ports 30 out of registry with ports 24 will determine the effective braking force applied to the movement of pistons 21 which in turn will apply a braking force to the rotation of shaft 14.

We do not mean to confine ourselves to the exact details of construction herein disclosed, but claim all variations falling within the purview of the appended claims.

What we claim is:

1. A fluid brake comprising a stationary housing, a shaft journalled through said housing, said housing being formed with a plurality of radially disposed cylinders, pistons slidable in said cylinders having apertured skirt portions, means connecting said pistons with said shaft for reciprocation of said pistons, said housing being formed with a chamber about said shaft and also formed with passages communicating the outer end portions of said cylinders with said chamber, transverse passages communicating with said outer end portions and with inner end portions of said cylinders for registry with said apertured skirt on movement of the piston thereof past a given point, an annular valve member rotatably carried by said housing formed with ports adapted for registry with said passages, and means for adjusting said valve member to regulate a partial flow of fluid from said cylinders to said chamber.

2. A fluid brake comprising a stationary housing, a shaft journalled through said housing, said housing being formed with a plurality of radially disposed cylinders, pistons slidable in said cylinders, means connecting said pistons with said shaft for reciprocation of said pistons, said housing being formed with a chamber about said shaft and also formed with passages communicating the outer end portions of said cylinders with said chamber, an annular valve member rotatably carried by said housing formed with ports adapted for registry with said passages, and means for adjusting said valve member to regulate the flow of fluid from said cylinders to said chamber, said housing also having bleeder passages communicating said first named passages with the inner portions of said cylinders.

3. A fluid brake comprising a stationary body formed with a central fluid chamber and a plurality of radially arranged cylinders, a shaft journalled through said chamber, eccentrics fixed to said shaft, pistons slidable in said cylinders having skirt portions, an aperture formed in each of said skirt portions spaced intermediate thereof, connecting rods connecting said pistons with said eccentrics, said body having radially disposed passages communicating the outer portions of each cylinder with said chamber, a ring-shaped valve member rotatably carried by said body and formed with ports adapted for registry with said passages, lever means for rotating said valve member.

4. A fluid brake comprising a stationary body formed with a central fluid chamber and a plurality of radially arranged cylinders, a shaft journalled through said chamber, eccentrics fixed to said shaft, pistons slidable in said cylinders, connecting rods connecting said pistons with said eccentrics, said body having radially disposed passages communicating the outer portions of each cylinder with said chamber, said body having bleeder passages communicating said first named passages with the inner portions of said cylinders, a ring-shaped valve member rotatably carried by said body and formed with ports adapted for registry with said passages, and means for rotating said valve member.

JOHN C. FOSTER, Sr.
JOHN HENRY BIGGS.
JOHN C. FOSTER, Jr.

REFERENCES CITED

The following references are of record in the file of this patent:

UNITED STATES PATENTS

| Number | Name | Date |
| --- | --- | --- |
| 1,476,170 | Morlan | Dec. 4, 1923 |
| 1,480,194 | Bixler et al. | Jan. 8, 1924 |
| 1,978,742 | Drake | Oct. 30, 1934 |
| 2,277,096 | Foster et al. | Mar. 24, 1942 |